J. L. MIDDLEBROOKS.
Rotary Cultivator.
No. 29,507.  Patented Aug. 7. 1860.
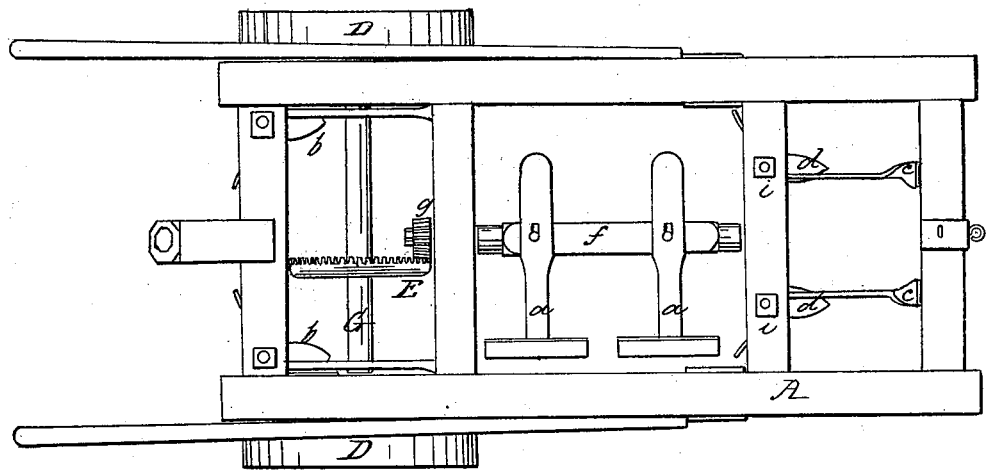
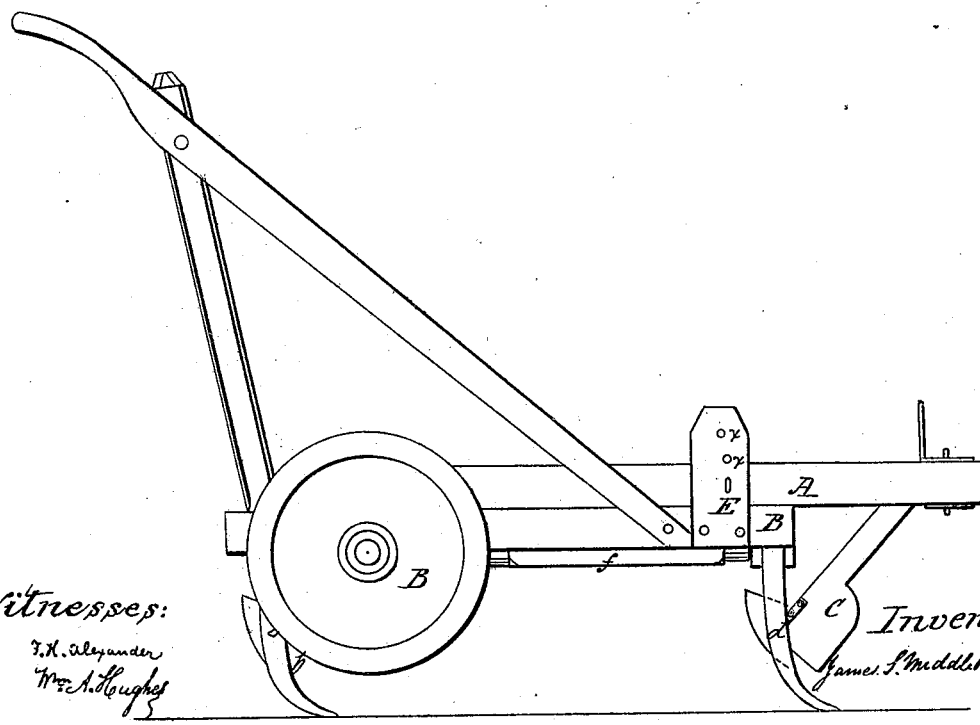

UNITED STATES PATENT OFFICE.

JAMES L. MIDDLEBROOKS, OF SALEM, GEORGIA.

IMPROVEMENT IN COTTON-CULTIVATORS.

Specification forming part of Letters Patent No. 29,507, dated August 7, 1860.

*To all whom it may concern:*

Be it known that I, JAMES L. MIDDLEBROOKS, of Salem, in the county of Clarke and State of Georgia, have invented certain new and useful Improvements in Cotton-Cultivators; and I do hereby declare that the following is a clear, full, and exact description of the same, reference being had to the annexed drawings, and to the letters of reference marked thereon, as forming a part of this specification, in which—

Figure 1 is a plan view, and Fig. 2 a side elevation.

The nature of my invention consists in the combination of such devices as will be hereinafter particularly described.

To enable others skilled in the art to make and use my invention, I will now describe its construction and operation.

A and B represent two frames placed in the position indicated in the drawings.

E E are parallel guides, secured on each side of the sides of frame B. Said guides are provided with graduated holes $x\ x$, by means of which the frame A may be adjusted.

D D are the driving-wheels on shaft G. Near the center of said shaft is secured the beveled spur-wheel F.

$f$ is a parallel shaft, which is located directly in the middle of frame B, and has its bearings on the under side of the cross-pieces of said frame.

$a\ a$ represent two revolving hoes. Said hoes are adjustable on shaft $f$, and may be so arranged that their fall will be simultaneous or alternately.

$g$ is a small gear-wheel, fixed upon the end of shaft $f$, and is operated by means of the large spur-wheel F, as is fully shown in the drawings.

$d\ d$ represent two plows, their stocks passing through the front cross-piece of frame B, and their ends provided with a screw-thread. Thus, by means of taps $i\ i$, may their depth be regulated.

$c\ c$ are two cutters, which are adjustable on cross-piece of frame A. Said cutters descend in a horizontal position immediately in front of plows $d\ d$, for the purpose of more effectually cutting the earth or roots, and thus enable the plows to advance with more ease.

$b\ b$ are also two plows, secured to the cross-piece at the hind end of frame B. Said plows are adjustable in the same manner as those already described.

Thus in the operation of my machine the cutters prepare the ground for the plows $d\ d$ which follow to turn and loosen the earth. After these come the revolving hoes, which thoroughly chop the weeds from between the rows of cotton. The plows $f\ f$, following in the rear, leave a furrow on each side for drainage.

Having thus fully described my invention, what I claim, and desire to secure by Letters Patent, is—

The revolving hoes $a\ a$, secured upon the shaft $b$, and operated, as shown, in combination with cutters $c\ c$, plows $d\ d$ and $f\ f$, the whole being constructed and arranged substantially as and for the purpose set forth.

JAMES L. MIDDLEBROOKS.

Witnesses:
   I. L. CHANDLER,
   W. H. THRASHER,
   SAML. FIELDING.